June 22, 1937.  H. B. LOMBARD  2,084,817
LAWN SPRINKLER
Filed July 21, 1936   2 Sheets-Sheet 1
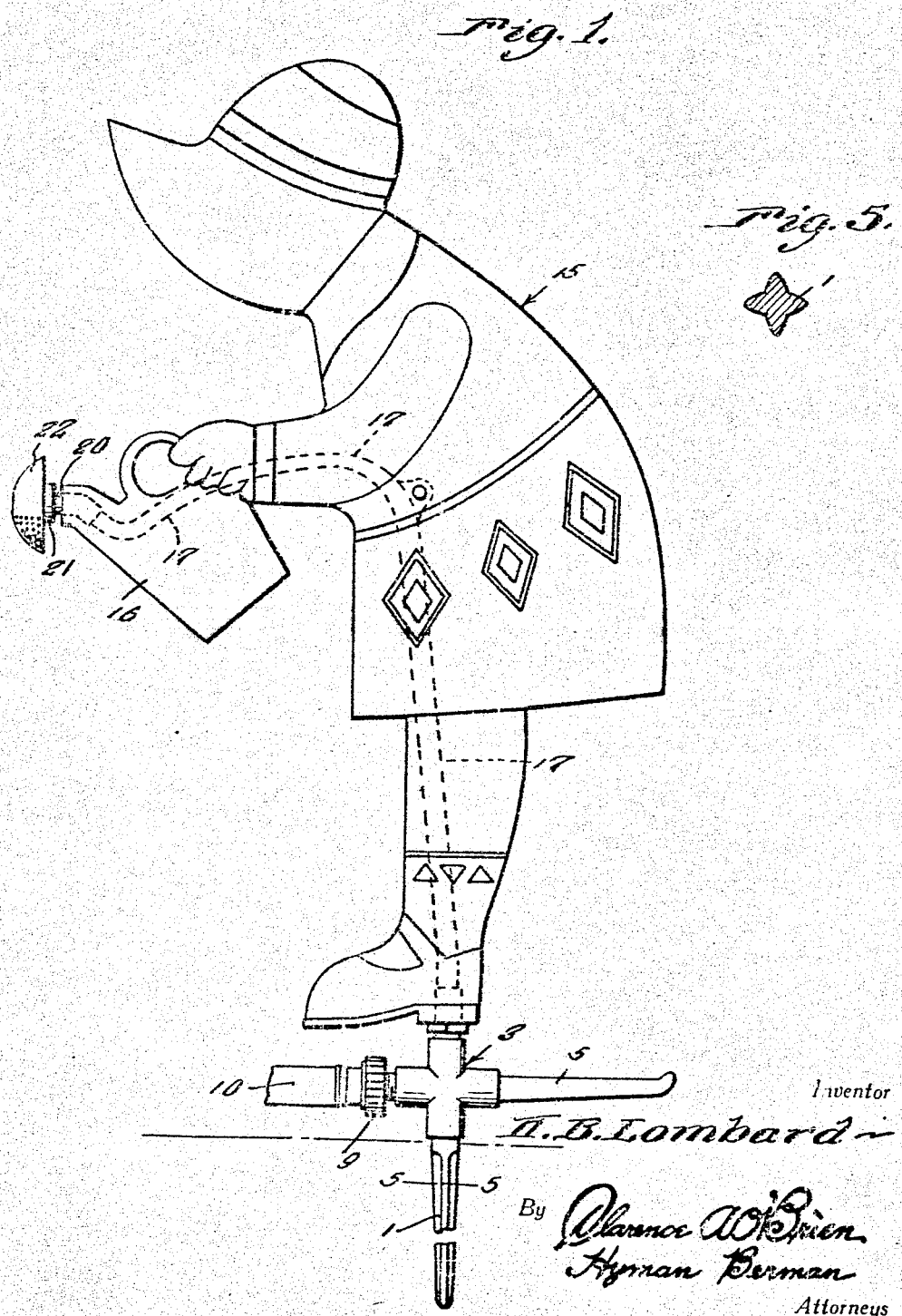

June 22, 1937. H. B. LOMBARD 2,084,817
LAWN SPRINKLER
Filed July 21, 1936 2 Sheets-Sheet 2
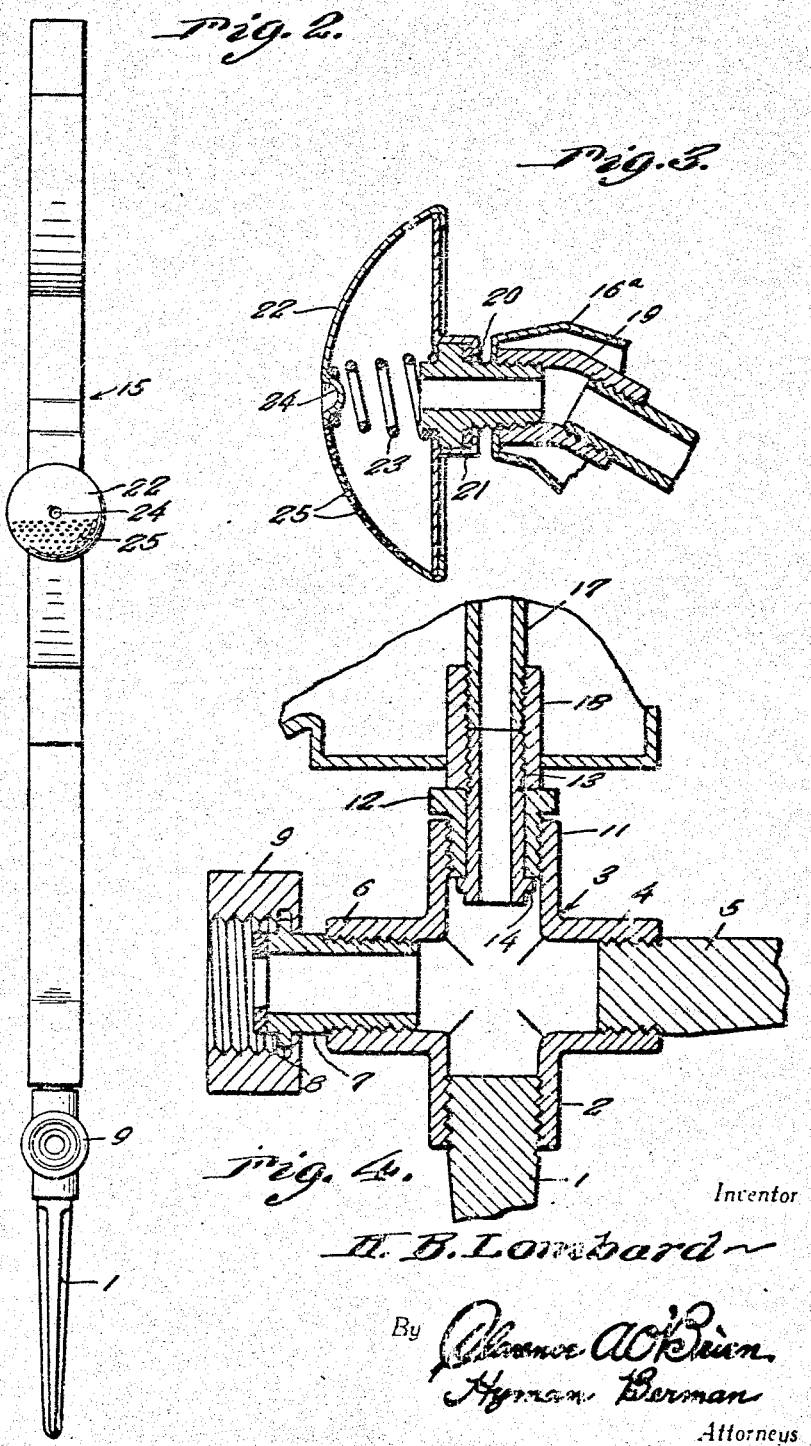
Inventor
H. B. Lombard Patented June 22, 1937

2,084,817

UNITED STATES PATENT OFFICE 2,084,817

LAWN SPRINKLER

Huel B. Lombard, Brookings, S. Dak.

Application July 21, 1936, Serial No. 91,741

3 Claims. (Cl. 299—69)

This invention relates to lawn sprinklers and has for its general object the provision of a lawn sprinkler of the type embodying a rotary element equipped with a nozzle for distributing the water over a large area.

Further, the invention has reference to improved means for mounting the sprinkler and for supporting the head for rotation.

The invention together with its objects and advantages will be best understood from a study of the following description taken in connection with the accompanying drawings wherein:—

Figure 1 is a side elevational view of the improved sprinkler.

Figure 2 is an edge elevational view thereof.

Figure 3 is an enlarged detail sectional view through the nozzle assembly.

Figure 4 is an enlarged vertical sectional view showing the mounting for the head, and Figure 5 is a detail sectional view taken substantially on the line 5—5 of Figure 1.

Referring to the drawings by reference numerals it will be seen that the improved sprinkler comprises a stake 1 adapted to be driven down into the ground and which stake 1 is preferably of the cross section clearly shown in Figure 5 and is tapered longitudinally. At its largest or upper end the stake 1 is threaded as shown in Figure 4 and has screwed thereonto a branch 2 of a substantially cruciform fitting 3. One of the lateral branches, for example the branch 4 of the fitting 3, has threaded thereinto one end of a foot-rest 5 provided to be engaged by a foot of the user in a manner to utilize the weight of the user in forcing the stake 1 into the ground.

Threaded into the other lateral branch of the fitting 3, for example the branch 6, is a nipple 7 with which is swivelly associated in any suitable manner and as indicated generally at 8 a coupling nut 9 through the medium of which one end of a hose 10 leading from a suitable source of supply is coupled with the fitting 3.

Threaded in the upstanding branch 11 of the fitting 3 is a bushing nut 12 in which is journaled the smooth or unthreaded portion of a nipple 13 that is formed at its inner end with a flange 14 to abut the inner end of the bushing nut 12.

The head of the sprinkler is indicated by the reference numeral 15 and the same is in the form of an upstanding figure or mannequin which may be of any desired type and material and which is intended, in accordance with the present invention, to be the representation of a human figure, for instance a sun-bonneted child, a girl, as shown in the drawings. The figure may be made of wood, metal or of any other suitable material finished in appropriate and bright colors so as to have an attractive appearance.

One of the features of the present invention is in having the Figure 15 include as an integral part thereof a watering can 16 in order to give the figure the appearance of sprinkling the lawn.

Suitably housed within the Figure 15 is a tube 17 of metal or other suitable material, and as shown in Figure 4 the tube 17 at one end is threaded and is connected with the nipple 13 through the medium of a coupling sleeve 18. At its respective opposite end the tube 17 terminates within the spout portion 16a of the watering can part 16 of the figure, and at said end is coupled through the medium of an elbow 19 with a nipple 20 on which is suitably swiveled as at 21 a substantially hemispherical spray nozzle 22. Arranged within the spray nozzle 22 is a spring 23 one end of which fits about the nipple 20 and the other end of which fits about a protuberance pressed inwardly from the concavo-convex plate portion of the sprinkler head 22.

For one-half thereof the concavo-convex head portion of the sprinkler nozzle 22 is perforated as at 25 for the issuance of the water in spray form from the nozzle.

In connection with the above it will be understood that the spring 23 places the nozzle 22 under tension as to prevent too free rotative movement of the nozzle 22 and to yieldably hold the nozzle in a desired set or adjusted position, that is to say in a position with the perforations 25 at the lower half of the nozzle 22, or with the nozzle 22 rotated for 180° with the perforated section disposed upwardly for directing the water spray upwardly, or with the spray head 22 rotated 90° for directing the spray more or less directly outwardly, and as may be found desirable.

As is thought apparent water under pressure is supplied to the device through the hose 10. The water from the hose will flow through the fitting 3 and upwardly through the tube 17 to discharge through the perforations 25 in the nozzle 22. As the water flows through the pipe 17 and issues through the perforations 25 of the nozzle the Figure 15 will rotate, making it appear that the figure is actually swinging the watering can 16 to simulate a person industriously engaged at the job of sprinkling the lawn.

It is thought that a clear understanding of the construction, utility and advantages of an invention of this character will be had without a more detailed description.

Having thus described the invention what is claimed as new is:—

1. A sprinkler of the character described comprising a stake adapted to be driven into the ground, a substantially cruciform fitting having a branch threaded onto the upper end of the stake, a member for use in driving the stake into the ground having an end threadedly engaged in a second branch of the fitting, a water supply hose coupled to a third branch of the fitting, a head, a tube extending through the head and movable therewith, means swivelly connecting one end of the tube with a fourth branch of said fitting, and a spray nozzle connected with the relatively opposite end of said tube.

2. A sprinkler of the character described comprising a stake adapted to be driven into the ground, a substantially cruciform fitting having a branch threaded onto the upper end of the stake, a member for use in driving the stake into the ground having an end threadedly engaged in a second branch of the fitting, a water supply hose coupled to a third branch of the fitting, a head, a tube extending through the head and movable therewith, means swivelly connecting one end of the tube with a fourth branch of said fitting, and a spray nozzle swivelly connected with the relatively opposite end of the tube, and a spring device arranged within the spray nozzle and connected therewith and with the tube in a manner to hold the spray nozzle at the desired position of rotative adjustment.

3. A sprinkler of the character described comprising a stake adapted to be driven into the ground, a substantially cruciform fitting having a branch threaded onto the upper end of the stake, a member for use in driving the stake into the ground having an end threadedly engaged in a second branch of the fitting, a water supply hose coupled to a third branch of the fitting, a head, a tube extending through the head and movable therewith, means swivelly connecting one end of the tube with a fourth branch of said fitting, and a spray nozzle swivelly connected with the relatively opposite end of the tube, and a spring device arranged within the spray nozzle and connected therewith and with the tube in a manner to hold the spray nozzle at the desired position of rotative adjustment, and said spray nozzle including a concavo-convex disk portion having one-half thereof imperforate and the other half perforated.

HUEL B. LOMBARD.